April 5, 1932. B. M. HAMLIN Re. 18,415

HAND LUGGAGE

Original Filed Nov. 11 1929 2 Sheets-Sheet 1

INVENTOR

Benjamin M. Hamlin

BY Sea Milton Jones

ATTORNEY

April 5, 1932. B. M. HAMLIN Re. 18,415

HAND LUGGAGE

Original Filed Nov. 11, 1929 2 Sheets-Sheet 2

INVENTOR

Benjamin M. Hamlin

BY Ira Milton Jones

ATTORNEY

Reissued Apr. 5, 1932

Re. 18,415

UNITED STATES PATENT OFFICE

BENJAMIN M. HAMLIN, OF RACINE, WISCONSIN, ASSIGNOR TO WHEARY TRUNK COMPANY, OF RACINE, WISCONSIN, A CORPORATION OF WISCONSIN

HAND LUGGAGE

Original No. 1,815,908, dated July 28, 1931, Serial No. 406,395, filed November 11, 1929. Application for reissue filed January 27, 1932. Serial No. 589,289.

This invention relates to certain new and useful improvements in hand luggage and has as the primary object the provision of an improved case whereby a man's suit may be readily carried without wrinkling and, at the same time, ample space provided for other articles without increasing the case overall size or weight.

A more specific object of this invention resides in the provision of an improved case having a removable garment hanger from which trousers, coat and vest are hung to be draped over the outer free end of a frame or support and there neatly held against wrinkling.

A further object of this invention resides in the provision of an improved case having means for securing a suit on the hanger and support which provides a pocket for the reception of collars, ties and other articles.

And a more specific object of this invention resides in the provision of an improved case having one or more compartments along one side thereof for the reception of shoes and other articles with the major portion of the casing forming a compartment for the reception of shirts and other garments, and having a combination removable coat hanger and garment frame mounted in the cover which cooperate to neatly support a suit without wrinkling, the hanger being removable from the case for use apart therefrom as a conventional clothes hanger.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which.

Referring now more particularly to the accompanying drawings, in which like numerals designate like parts throughout the several views, 5 represents the main section of a luggage carrier of the hand case type having a cover 6 hingedly connected with the main section along one marginal edge, as at 7. As is customary, the case is provided with a conventional handle 8 and locking devices 9.

Figure 4:
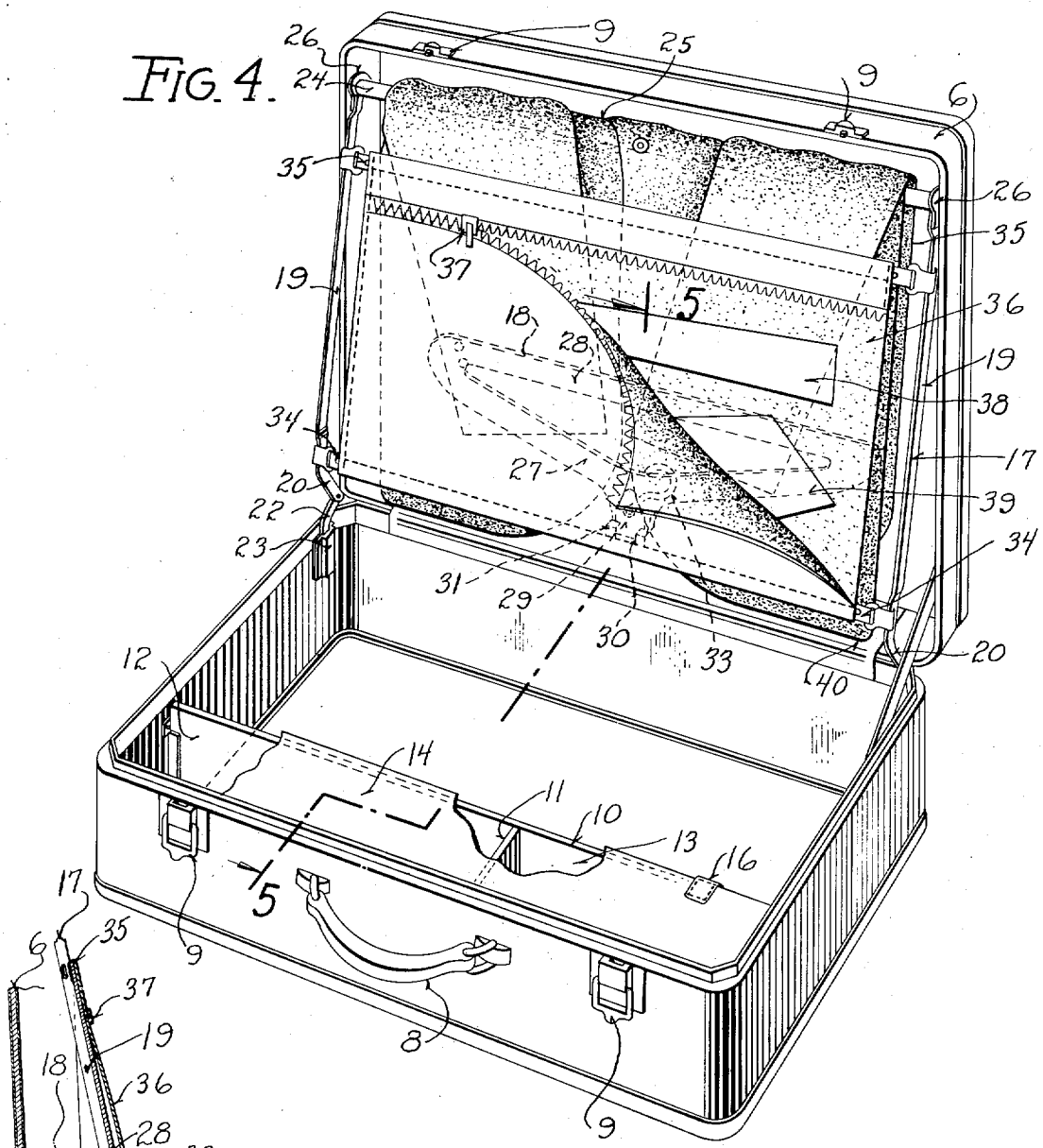
Figure 4 is a perspective view similar to Figure 1 of a slightly modified form of my invention.
Figure 5:
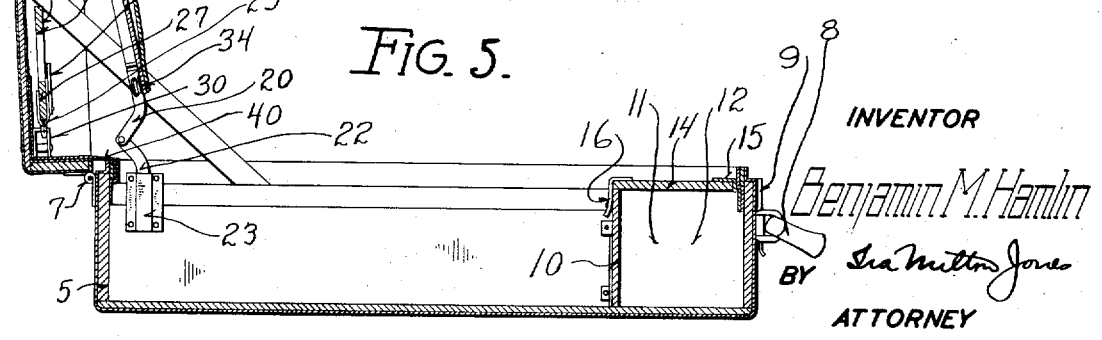
Figure 5 is a transverse sectional view taken through Figure 4 on the plane of the line 5—5.

In that form of my invention illustrated in Figures 4 and 5, the main section of the case has a partition 10 parallel with and spaced from its front wall to provide an elongated space which is divided by a transverse partition 11 to form two compartments 12 and 13 for the reception of toilet articles, shoes and the like. A suitable cover 14 hinged to the front wall of the case, as at 15, closes the compartments, fastening means 16 being provided for securing it closed. If desired, the partitions 10 and 11 may be removably secured so that they may be withdrawn and the entire case used for clothing.

Provision is made for carrying a complete man's suit over the top of the main section or in the cover 6 without wrinkling by means of a garment carrying frame 17, cooperating with a suit hanger 18. The frame 17 is substantially U-shaped and its side arms 19 have their ends 20 directed at an angle and, in Figure 1, pivoted as at 21, to the side walls of the cover 6 adjacent its hinged connection with the main section.

In Figure 4, the ends of the frame are connected with attaching members 22 by which the frame is removably secured in the main section of the case. The attaching members 22 also have their ends adjacent the arms 19 directed angularly and their free ends are removably engaged in channel members 23 secured to the side walls of the main section adjacent their inner ends.

The closed end of the U-shaped garment carrying frame has a substantially semi-circular bar 24 secured thereto which is preferably padded to prevent creasing of the suit 25 which has its medial portion folded thereover, there being guards 26 at the outermost ends of the bar 24 to hold the suit against longitudinal shifting.

The hanger 18 is substantially a conventional man's coat hanger, having its top portion 27 of a shape to fit the shoulders of the coat and having a bottom transverse bar 28 over which trousers may be draped. The top portion of the hanger has an approximately T-shaped head or fastener 29 secured thereto for engagement in the T-shaped slot 30 of a keeper 31 centrally fixed to the top of the cover adjacent its hinged connection 7. The keeper 31 is substantially channel shaped and the small central portion of the T slot 30 extends into its forward vertical flange or wall 32 to permit movement of the hanger to an angular position with respect to the cover, or in other words to permit the hanger with a suit on it to assume a horizontal position when the cover is open to facilitate proper arrangement of the suit. The hanger is further provided adjacent the keeper with a pivoted hook 33 to enable it to be used apart from the case, as will be readily apparent.

Figure 1:
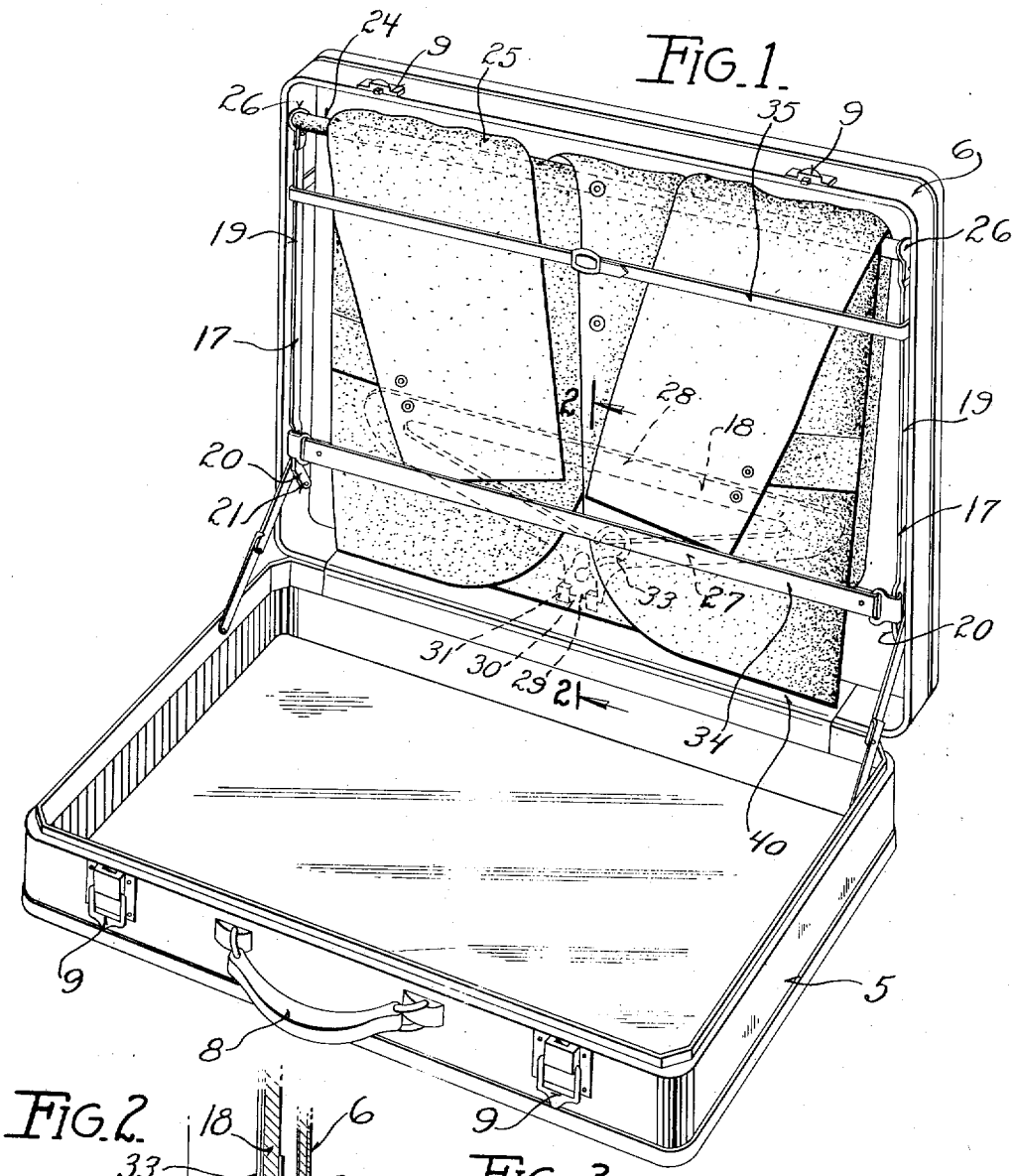
Figure 1 is a perspective view of a man's case embodying my invention, the case being shown in open position with a man's suit in place therein.
Figure 2:
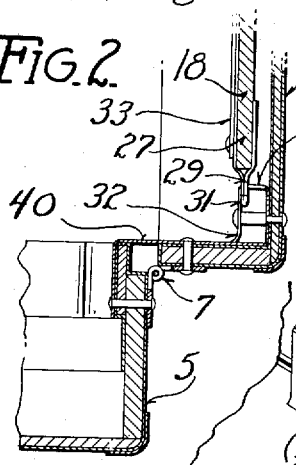
Figure 2 is an enlarged fragmentary, sectional view taken through Figure 1 on the plane of the line 2—2.
Figure 3:
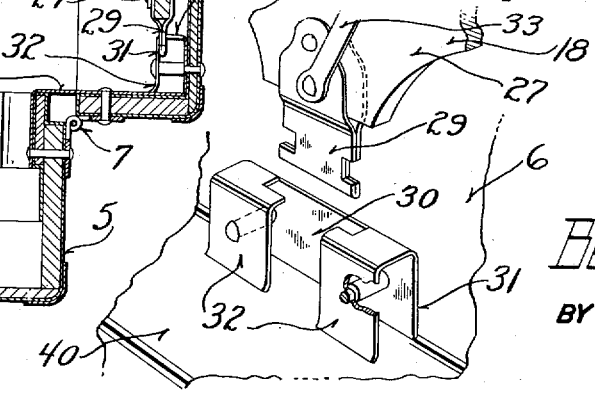
Figure 3 is a fragmentary, perspective view illustrating the manner of removably and pivotally securing the garment hanger in the case.

In arranging a suit in the case, the trousers are draped over the horizontal bar 28 of the hanger, the coat and vest placed thereon in the conventional manner and the hanger then secured in the keeper 31 with the garment frame 17 in a horizontal position. The suit is then straightened out to avoid creases and the frame swung upwardly on its pivot causing the suit to fold over the bar 24, as illustrated in Figures 1 and 4. Straps 34 and 35 are then extended from the side arms of the frame to hold the suit in position and to prevent the end thereof from dropping into the main section of the case.

In the modification illustrated in Figure 1, the topmost strap 34 may be carried by the cover so as to simultaneously secure the frame and the suit within the cover, however, other means may be provided for retaining the frame within the cover, as illustrated in the co-pending application Serial No. 404,297.

In the structure shown in Figure 4, in which the frame is carried by the main section, the straps 34 and 35 are preferably connected by a fabric pocket structure 36 to permit the carrying of ties 38 and 39 or similar articles, the cover or flap of the pocket being secured in its closed position by a suitable fastening means 37. In this form of my invention the garment is placed therein in the same manner as illustrated in Figure 1 and when the case is to be closed the support is preferably swung to a position over the case before the cover is closed.

It will be noted that in both modifications the hinged joint between the main section and the cover is provided with a guard 40 to prevent portions of the suit, especially the lower part of the coat, from being impinged between the cover and the main section in closing.

From the foregoing description, taken in connection with the accompanying drawings, it will be readily apparent to those skilled in the art to which an invention of the character described appertains, that I provide an improved type of hand luggage especially adapted for men's clothing and wherein a complete suit may be carried without wrinkling and without necessitating an increase in the size or the weight of the case.

What I claim as my invention is:

1. Hand luggage of the character described, including a main section and a cover therefor, a garment supporting frame having garment engaging means and spaced members, means pivotally mounting the garment supporting frame, a garment hanger, means mounting the garment hanger whereby the hanger is normally disposed between the spaced members of the supporting frame remote from its garment engaging means and whereby a suit draped around the hanger may be extended over the garment engaging means of the supporting frame and folded thereover between the spaced members, and means for maintaining the suit in position over the frame.

2. Hand luggage of the character described, comprising similar hingedly connected sections, a garment hanger, means for mounting the garment hanger in one of the sections, a garment supporting frame, means pivotally mounting the supporting frame adjacent the hinged connection of the sections, said means permitting movement of the frame into and out of alignment with either section when in open position to facilitate the draping of a suit about the hanger, and folding it medially over the garment supporting frame, and means for maintaining the suit against displacement from the supporting frame.

3. Hand luggage of the character described, comprising hingedly connected sections, a garment supporting frame, means pivotally mounting the supporting frame adjacent the hinged connection of the sections, said frame having a garment receiving bar, a garment hanger, means readily detachably mounting the garment hanger adjacent the hinged connection of the sections, said hanger being adapted to have a suit draped thereon whose medial portion is foldable over the garment carrying bar, and means for securing the suit in its folded position over the bar.

4. Hand luggage of the character described, comprising two hingedly connected sections, a garment supporting frame, means pivotally mounting the supporting frame in one of the sections adjacent its hinged connection with the other, a garment hanger, means readily removably securing the garment hanger in said first-mentioned section, the hanger being adapted to have a garment draped thereabout whose medial portion is foldable over the garment supporting frame to hang with its lower portion adjacent the hinged connection of the sections, and means for preventing said lower portion of the garment from being jammed between the hingedly connected sections of the luggage.

5. Hand luggage of the character described, comprising hingedly connected sections, a garment supporting frame, means pivotally mounting the frame adjacent the hinged connection of the sections, a garment hanger, interlocking means carried by the hanger and one of said sections for readily removably mounting the hanger from said section independently of the frame, said means permitting movement of the hanger to and from a position parallel with respect to the section in which it is mounted to facilitate draping of a suit about the hanger, the medial portion of the suit being foldable about the garment carrying frame, and means for maintaining the suit properly positioned on the garment supporting frame.

6. Hand luggage of the character described, comprising hingedly connected sections, a garment supporting frame having spaced side members and a garment supporting rod connecting the side members, means pivotally mounting the side members adjacent the hinged connection of the sections, and a garment hanger mounted adjacent the pivotal mounting of the frame and movable to be normally in substantially the plane of the frame, whereby a suit draped around the hanger may be folded over the garment supporting rod of the frame.

7. Hand luggage of the character described, comprising similar hingedly connected sections, a garment supporting frame having spaced side members, and a garment supporting rod connecting the side members, means pivotally mounting the side members adjacent the hinged connections of the sections, a garment hanger mounted adjacent the pivotal mounting of the frame and movable to be normally in substantially the plane of the frame whereby a suit draped around the hanger may be folded over the garment supporting rod of the frame, and means for maintaining a suit so positioned in substantially the plane of the frame.

8. Hand luggage of the character described, comprising similar hingedly connected sections, a garment hanger, means for mounting the garment hanger in one of the sections, a garment supporting frame, and means pivotally mounting the supporting frame adjacent the hinged connection of the sections, said means permitting movement of the frame into and out of alignment with either section when in open position to facilitate the draping of a suit about the hanger, and folding it medially over the garment supporting frame.

9. In a hand luggage case including hingedly connected complementary sections, a member hingedly mounted adjacent the hinged connection of the complementary sections and adapted to overlie either section when the case is open, a garment supporting bar at the outer free end of said member, a garment hanger, and means for mounting the garment hanger adjacent the hinged connection of the complementary sections whereby a garment draped over the hanger may be extended outwardly over said member and folded over the supporting bar.

In testimony whereof, I hereunto affix my signature.

BENJAMIN M. HAMLIN.